May 18, 1971   W. H. EBURN, JR., ET AL   3,579,406
HIGH SPEED PRECISION COMBINER
Filed July 25, 1968   10 Sheets-Sheet 1

INVENTORS,
WILLIAM H. EBURN, JR.
CHARLES T. RAYMOND
BY Watson, Cole, Grindle & Watson
ATTORNEYS

FIG. 6

INVENTORS,
WILLIAM H. EBURN, JR.
CHARLES T. RAYMOND

BY Watson Cole
Grindle & Watson
ATTORNEYS

United States Patent Office 3,579,406
Patented May 18, 1971

3,579,406
HIGH SPEED PRECISION COMBINER
William H. Eburn, Jr., Stamford, and Charles T. Raymond, Westport, Conn., assignors to Selchow & Righter Company, Bay Shore, N.Y.
Filed July 25, 1968, Ser. No. 747,689
Int. Cl. B65c 9/08; B65h 1/22
U.S. Cl. 156—571                                                13 Claims

ABSTRACT OF THE DISCLOSURE

Apparatus for combining two sets of sheet material in a registered relationship to one another includes separate means for feeding each set of sheet material in synchronization with one another, a number of gripping mechanisms for grasping the individual sheets of a first material to transport it onto a rotating drum mechanism wherein the gripping mechanisms accelerate from a position at rest to a speed substantially equal to the speed of rotation of the drum to deposit the first sheet material in a registered position thereon, a blanket mounted in registered position on the surface of the drum and having perforations for developing a vacuum to retain the individual sheet material, means for applying adhesive to the individual sheets of the material on said drum, means for combining the two sheets of material in aligned relationship to each other, and means connected with said drum to provide a positive blow-off pressure to said first sheet material at said means for combining. The means for delivering the second sheet material includes a hopper for receiving and storing the material in vertically stacked relationship and means for sensing the height of the material to control the delivery of a second sheet material to the hopper. The delivery and hopper mechanisms are mounted on movable rails whereby those mechanisms can be elevated to disengage the second sheet material from a feeding mechanism in the absence of second sheet material. The delivery means for the second sheet material has a speed control which is regulated to prevent damage of the second sheet material when it is engaged by the driving means and when the second material is delivered to the means for combining.

---

This invention relates to apparatus for combining sheet material, and more particularly, to such apparatus for combining individual sheet material to the surface of a baseboard to form gameboards and the like.

There has been a continuing need in many industries for automatic or semi-automatic machinery to apply adhesive to a surface of a paper sheet and then to apply the sheet in a registered position on the surface of a thicker baseboard material. Exemplary of such an industry is the manufacture of gameboards in which a printed sheet is fastened to a baseboard to form a sturdy and rugged playing surface on which various gamepieces or elements can be moved.

Machinery exists for performing such a combining operation in a semi-automatic manner; however, such apparatus as is known to the industry is complex and operates at too slow a rate to be economical.

It is an object of this invention to provide a combining apparatus that operates at a high speed and which requires minimal human supervision.

Another object is to provide a reliable apparatus of the aforementioned type that is less complex than previously known apparatus for performing a similar function.

Still another object is to provide a combining apparatus which enables sheet material to be applied to a baseboard with precision registration at high speed.

A further object of the invention is to provide a combining apparatus that is readily adaptable to accommodate different sized sheet and baseboard material.

And yet another object is to provide such an apparatus which permits adjustment of the sheet and baseboard registration within closely defined tolerances.

A still further object of the invention is to provide apparatus of the aforementioned type which mates the sheet material to the baseboard material in a manner to eliminate subsurface air bubbles and a blistered appearance of the sheet material.

And still another object is to provide such a combining apparatus that is capable of being interrupted in the event of either a sheet or baseboard misfeed.

And yet still another object is to provide a combining apparatus that operates at selected varied speeds and which automatically maintains synchronous operation between its cooperating elements at all speeds of operation.

And yet still a further object of this invention is to provide a combining apparatus that is capable of high speed operation without damaging the sheet and/or the baseboard material.

In accordance with one feature of the invention, sheet material is fed from a hopper storage unit by a combination of a vacuum sheet feeder with a swing gripper mechanism to place the sheet material on a rotating vacuum drum. The sheet material is fed from the storage hopper one sheet at a time into a pre-registered position and then placed into a final registered position. In its preregistered position the sheet material lies against one movable side guide and a front guide stop assembly. After an individual sheet has been stopped by the front guide stop assembly and registered in a longitudinal direction, a drop bar assembly registers the sheet in the transverse direction. The reciprocating swing gripper mechanism mechanically grips the sheet material at the leading edge by a unique finger mechanism which is actuated in timed coordination with the feeding and registration of the sheet material. The reciprocating swing gripper mechanism is driven by a cam arrangement which imparts a uniform acceleration to the mechanism from rest to the exact speed of the rotating vacuum drum whereby the leading edge of the sheet material is deposited in a registered position on the surface of the rotating drum. The registration of the front guide stop assembly, side guide and swing gripper mechanism with respect to the rotating vacuum drum is adjustable to enable the sheet material to be registered on the vacuum drum with very accurate precision so that the sheet material may be accurately placed on the baseboard material.

A further feature of the invention is the rotary vacuum drum which has mounted on it a rubber blanket cut to approximately one-sixteenth of an inch smaller than the dimensions of the sheet material. The blanket has suction holes to hold the sheet material in position on the vacuum cylinder after it has been deposited by the swing gripper mechanism. The vacuum cylinder accommodates different sized rubber blankets for the handling of variously sized sheet material. The swing gripper mechanism operates in timed relationship with the vacuum cylinder so that the sheet material is deposited at a predetermined registered position on the rubber blanket at the leading edge of the blanket.

Another feature of the invention is a modification of a standard three-roller glue mechanism to prevent the sheet material on the vacuum drum from adhering to the final glue roller.

Taut wire pick-offs are strung between suitable frame members and ride in grooves on the final glue roller. These wire pick-offs enable the sheet material to receive glue from the final glue roller but prevent the paper from adhering to it.

A still further feautre of the invention is the manner in which the sheet material is caused to be applied to the base material. Essentially, the inventive apparatus causes the glued sheet material to be rolled onto the base material to prevent the entrapment of air between the sheet material and the base material which would result in a blistered appearance. The rolled motion whereby the sheet material is mated to the base material is achieved by passing the base material between the vacuum cylinder and an additional roller. The sheet material is stripped from the vacuum mechanism by its adherence with the base material as the vacuum cylinder rotates and makes continuing contact with the base material as it passes through the point of tangency between the vacuum cylinder and the additional roller. A positive blow-off pressure is also applied to the sheet material as it passes between the vacuum cylinder and the pressure roller by a stationary manifold assembly which is mounted adjacent an end of the vacuum cylinder.

And yet another feature relates to the mechanism for delivering baseboard material to the combining mechanism by a conveyor on which the base material is placed in shingled, overlapping relationship so that it will advance automatically from the end of the conveyor into a feed hopper mechanism where it forms a vertical stack. The base material is fed one sheet at a time from the bottom of the stack in the feed hopper to the combining means. The height of the stack is controlled by a reciprocating sensor mechanism which strokes up and down every cycle of the combining apparatus to sense the height of the stack and acts as a guiding means for the leading edge of the bottom board to pass through one-board calipers. Suitable transducer means provide a signal which is compared with a predetermined reference signal and if the stack is sufficiently high the conveyor mechanism is not activated. If the stack is too low, however, the conveyor mechanism is automatically turned on to move more base material into the stacking hopper so as to maintain it at a predetermined height.

A further feature relates to a differential drive which causes a feeding lug, mounted on an endless chain mechanism, to move at varying speeds so that it may drop behind the moving base material as it moves through the combining cylinders, previously mentioned, to allow room for the lugs to radius around a sprocket without cutting through the base material. The chain moves in a continuous motion which is synchronized with the rotation of the vacuum cylinder only during that part of the cycle necessary to feed the base material between the combining roller and the vacuum cylinder. Once the base material has been gripped between these two cylinders, the drive chains are automatically slowed down allowing the feeder lugs engaging the rear end of the base material to slow down and fall behind the trailing edge of the base material and radius around a sprocket without cutting the board. The lugs also slow down at the board pick-up point to decrease the tendency to mark the trailing edge by the impact of the lugs.

And yet another feature relates to the flow of base material to the combining cylinder mechanism which may be interrupted by a mechanism which raises the stacked material in the hopper so that the feeder lugs no longer engage the bottom sheet in the hopper. The raising mechanism comprises a sliding surface which rises from between and below the pusher chain in such a manner that it is also possible to interrupt the passage of a sheet material after it has emerged from the hopper stacker and is en route to the combining mechanism.

And still another feature relates to a means for moving the glue roller assembly away from the vacuum cylinder to prevent glue from being applied to the cylinder in the event that there is no sheet material being fed to the swing gripper mechanism.

And yet still another feature of the invention is the provision of a removable side frame assembly which supports the vacuum drum drive shaft to enable easy removal and replacement of the drum assembly without disassembling the entire side frame of the apparatus.

The novel features which are believed to be characteristic of the invention, both as to its structural organization and mode of operation, together with further objects and advantages thereof, will be better understood from the following description considered in connection with the accompanying drawings wherein an illustrative embodiment of the invention is set forth. It is to be expressly understood that the drawings are for purposes of illustration and description only and they are not intended in any way to define the scope of the invention.

In the drawings:

FIG. 13a is an enlarged side elevational view of a typical pusher element;

Figure 1:
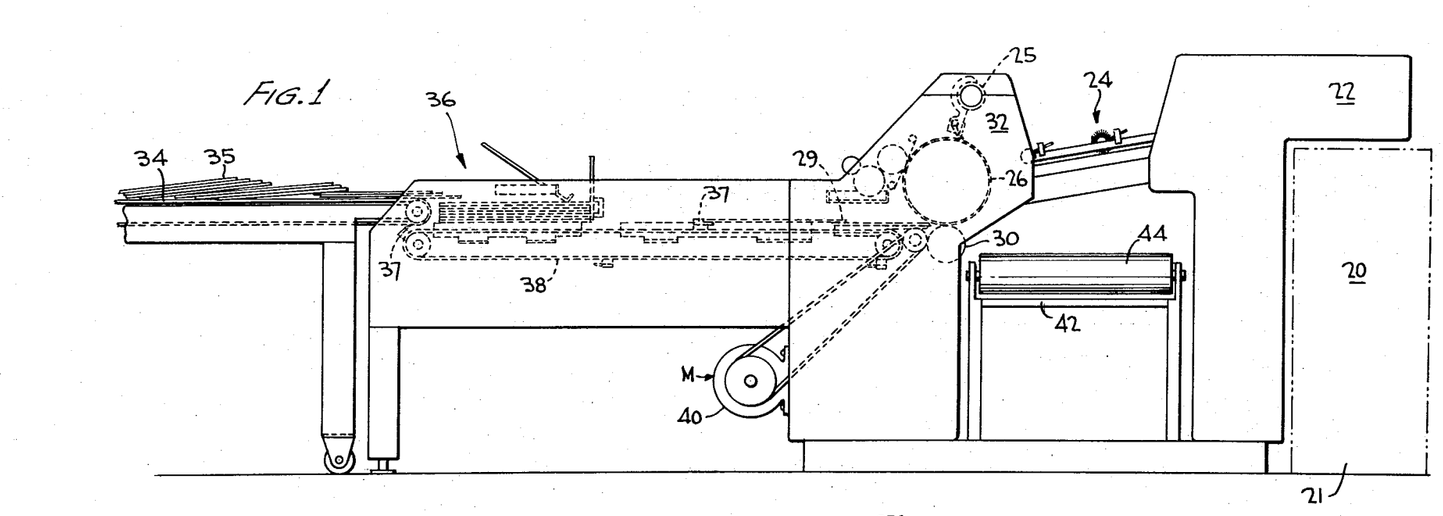
FIG. 1 is a side elevation view of the combiner apparatus showing the relationship of the various component elements.
Figure 2:
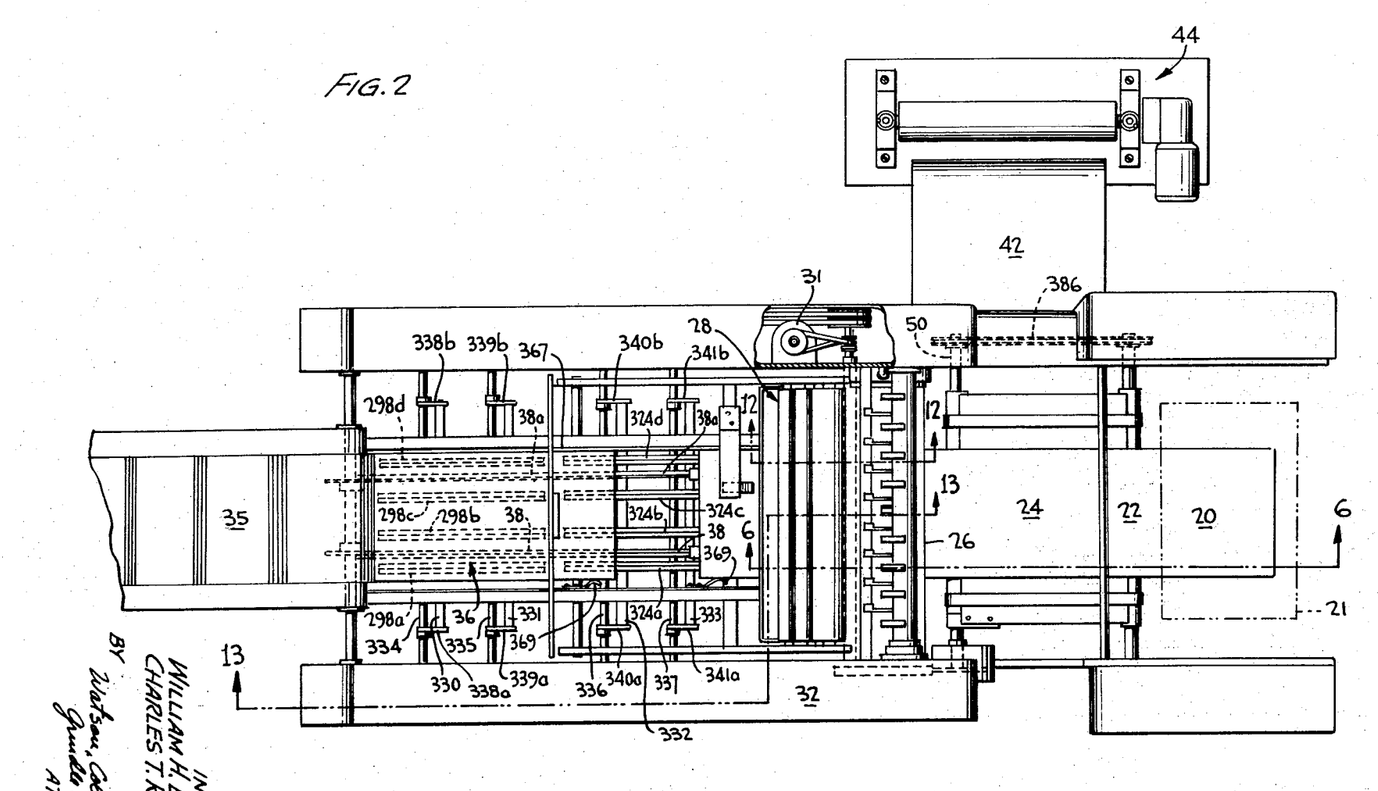
FIG. 2 is a plan view of the combiner apparatus.

The basic components of the combiner apparatus are illustrated in FIGS. 1 and 2 in their assembled, operative relationship. Sheet material 20, individual sheets of which are to be mated to the surface of a baseboard material by the combining apparatus, consists of a vertical stack resting on platform 21 which is constructed to move vertically to provide an available supply of sheet material. Sheet feeder 22 is a standard type which has been developed for use with printing presses and is commercially known as a Harris Sheet Feeder. A Mabeg non-stop feeder, also well known to the printing industry, could also be used. In fact, such units are of the "stream feeder" type (which provide a continuous stream of sheet material in shingled, overlapping relationship) and are highly reliable and fast operating. Their wide usage in the printing industry obviates the necessity of providing a detailed description of their operation for the purposes of this invention. Essentially, any sheet feeder of the "stream feeder" type would be satisfactory, provided the stream feed was at least 120–150 sheets per minute which is the upper speed limit of the combining apparatus according to this invention. Briefly, the individual sheet material may be lifted from stack 10 by a reciprocating vacuum mechanism which operates in timed relationship with the combining apparatus.

The reciprocating motion of sheet feeder 22 deposits the individual sheet material onto infeed assembly 24 in overlapping, shingled relationship. Infeed assembly 24 includes means for registering the individual sheets along both the longitudinal axis and transverse axis of the stream fed input. More particularly, each sheet of material is registered by a reciprocating side guide and a movable front stop to provide the necessary precise alignment of each sheet before it is transported to a vacuum drum. Such registering means are known to the art, and are those which are normally used in printing presses; however, their use with such elements as the swing gripper assembly, provide unique capabilities of the inventive apparatus. The operation of the registering means must be timed with the operation of the other component elements of the combining apparatus. The registration of the individual sheet material by infeed assembly 24 enables the sheet material to be precisely positioned with respect to the board material with which it is to be mated.

Infeed assembly 24 also includes means for sensing the absence of sheet material and means for preventing the passage of two or more overlapped sheets. In the absence of a sheet, the sensor activates means for interrupting the feed of board material and causes glue assembly 28 to be withdrawn from vacuum cylinder 26 to prevent adhesive from being applied to its surface. The presence of two or more sheets has the same effect as the absence of a sheet because the plural sheet detector causes a jam to prevent sheet passage to the swing gripper mechanism. The machine is then automatically placed in an idle mode. Both the sheet sensor and the plural sheet prevention means will be described more fully hereinafter.

The stream of sheet material is provided from infeed assembly 24 to swing gripper assembly 25 where reciprocating swing grippers engage the material at its leading edge and carry it forward and deposit it onto rotating vacuum cylinder or drum 26. The swing grippers, to be more fully described hereinafter, are driven by a cam arrangement which imparts to them a uniform acceleration from rest so that they attain the same speed as that of rotating drum 26 whereby the leading edge of each sheet is deposited on the moving drum without interrupting the drum rotation. The rotative reciprocating motion of the swing grippers and the simultaneous gripping action is timed by a cam assembly (not shown) with the input feed of the sheet material so that each sheet is grasped by the swing grippers in exact register at its leading edge and deposited on the surface of vacuum cylinder 26 in a precise registered position.

Adhesive is applied to each sheet of material as it revolves on vacuum drum 26 by glue roller assembly 28. The further rotation of vacuum drum 26 carries the sheet into registered contact with board 29 which has been transported to the juncture of vacuum drum 26 and pressure roller 30 in timed relationship with the transport of the sheet from infeed assembly 24. The sheet is mated to the surface of board 29 as both the board and sheet pass between vacuum drum 26 and pressure roller 30. The sheet is impressed onto the surface of board 29 by a roller-type motion which eliminates the entrapment of air and prevents a blistered appearance of the mated board and sheet.

Baseboard material, to which the sheet material is to be affixed, is loaded onto endless conveyor 34 either automatically or manually in shingled fashion for reasons which will become apparent as the detailed operation of the board infeed mechanism is more fully described hereinafter.

Board material 35 is deposited from conveyor into hopper 26 where it is stacked vertically in position to be picked up and fed to vacuum drum 26 and pressure roller 30 by pusher lugs 37. Pusher lugs 37 are mounted at spaced positions on endless conveyors with lugs mounted at 38, 38a to engage the bottommost board from the vertical stack in hopper 36. The boards are pushed by lugs 37 on rails 39, 39a. Board feeder 36 includes means for sensing the vertical height of the boards and for controlling the movement of endless conveyor 34 to maintain the supply of boards in hopper 36 within predetermined minimum and maximum levels. Hopper 36 and rails 39, 39a are also mounted to be raised or lowered vertically to interrupt the feeding of the board material. The elevating mechanism for hopper 36 and rails 39, 39a also operates in conjunction with a sheet sensing means in infeed assembly 24 so that in the absence of a sheet of material being fed into swing gripper assembly 25, hopper 36 and rails 39, 39a are elevated to prevent the further feeding of board material to vacuum drum 26 and pressure roller 30.

The activation of the hopper and rail elevation mechanisms on the board infeed causes the combining apparatus to go into an idle mode whereby sheet material is no longer fed into infeed assembly 24 by sheet feeder 22. Similarly, if no sheet material is sensed by the sheet sensor in infeed assembly 24, the apparatus is also placed into an idle mode to prevent the infeed of either sheet material or board material to the apparatus.

The combined board and sheet emerge from between vacuum drum 26 and pressure roller 30 onto exit conveyor 42 and under final squeeze roller 44 which insures that the sheet material is securely fastened to the baseboard material. Upon exiting from final squeeze roller 44 the combined sheet and board may be dumped into a suitable collecting station (not shown).

Figures 3, 4, 5:
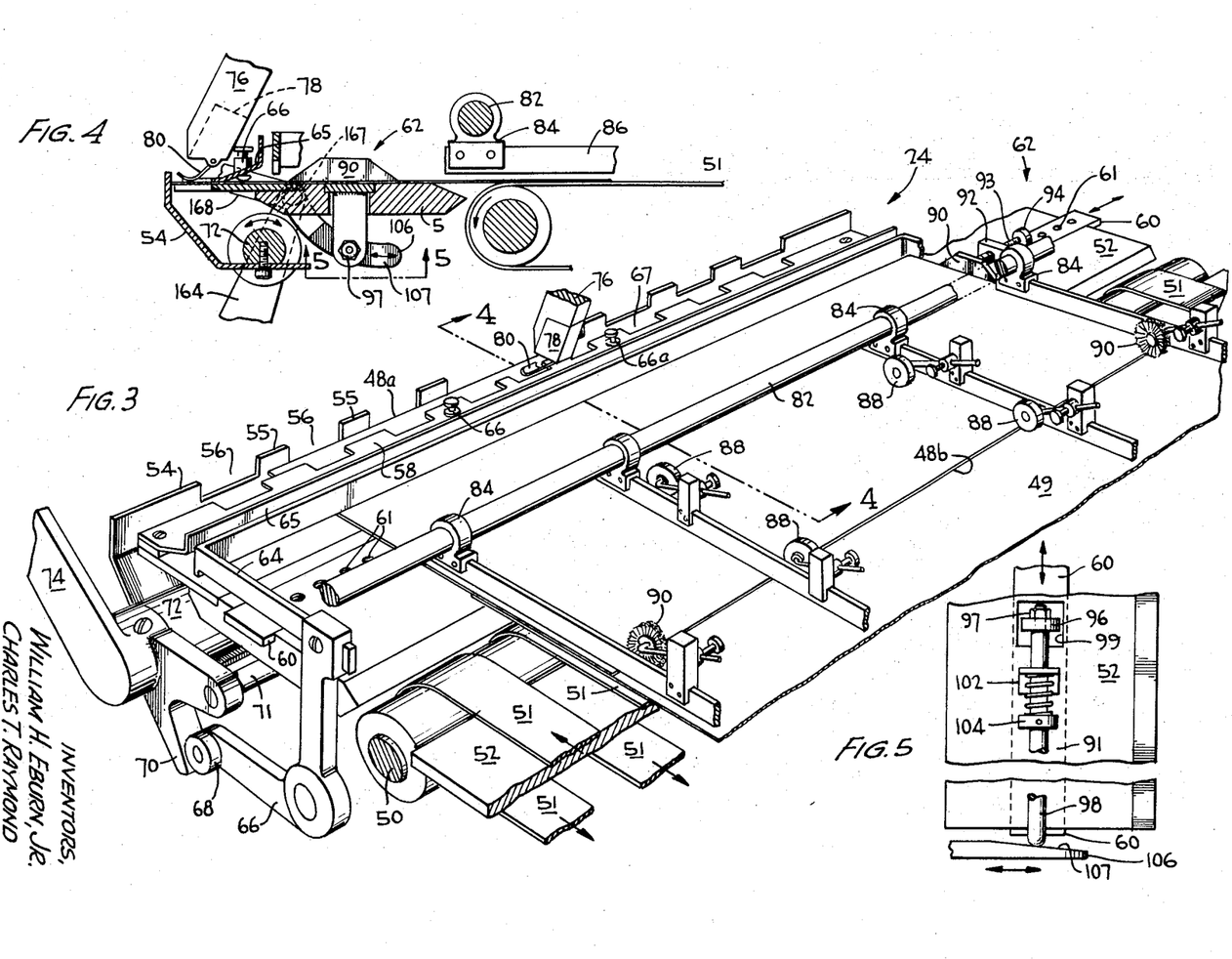
FIG. 3 is a perspective view of the sheet infeed and registration assemblies.
FIG. 4 is a sectional view of the sheet infeed and registration assembly and, particularly, the sheet sensor, front stop bar and side guide register taken along section 4—4 of FIG. 3.
FIG. 5 is a bottom view of the side guide register taken along section 5—5 of FIG. 4.

The structural features of the elements comprising infeed assembly 24 are shown in FIG. 3. Shaft 50 is mounted to the side frames (not shown) and is rotatably driven to move endless conveyor belts 51 thereby transporting shingled sheets 48, 49 (only two being shown for purposes of clarity) over plate 52 from sheet feeder 22 (FIGS. 1 and 2) to swing grippers 25 (reference FIG. 6). The leading edge 48a of sheet 48 is intercepted and stopped by stop bar 54 which has been raised into position by the timed movement of arm 74 by means which will be more fully described hereinafter. Stop bar 54 extends the full width of support plate 57, which supports the leading portion of sheet 48, and is formed to include a plurality of alternating stops 55 and apertures 56. The apertures are spaced to receive the reciprocating fingers of the swing gripper mechanism which grasp the leading edge 48a of the sheet to transport the sheet to the vacuum drum. Support plate 57 also includes a plurality of alternately positioned extension members 58 and apertures 59 which are aligned with stop pieces 55 and apertures 56 of stop bar 54 to provide vertical clearance to enable the gripper fingers to grasp the sheet.

Support plate 57 includes registration bar 60 which is slidably mounted in a transverse slot in the support plate.

Spaced holes 61 provide adjustable mounting for side guide register assembly 62 and afford course, side registration of the sheet material in infeed assembly 24. Side guide register assembly 62 also includes side plate 90 and bracket 92 supporting screw 93 and knurled knob 94 to provide a vernier adjustment for extremely precise registration of the sheet material transversely to the sheet infeed.

Drop bar 64 is raised to allow passage of the leading edge of the sheet material to stop bar 54 and then is dropped into a position spaced approximately one sixty-fourth of an inch (1/64") from the surface of the sheet to prevent the sheet from buckling prior to its side registration by register assembly 62. Guide plate 65 is suspended across the width of support plate 57 to provide a narrow clearance between it and plate 57 to prevent the sheet from curling upwards. Wedge members 66, 66a mounted to block 67 are vertically adjustable to provide an aperture of slightly more than one and less than two sheet thicknesses and constitute a means for preventing the simultaneously delivery of more than one sheet to stop bar 54. Preferably, wedge members 66, 66a are adjusted for a clearance of one and one-half sheet thicknesses.

Drop bar 64 is raised and lowered by its attachment to arm 66 which includes follower 68 engaging lever 70. Shaft 71 couples lever 70 to a similar lever and drop bar actuator on the other side of infeed assembly 24.

Brace 76 serves to mount contact 78 above the surface of the sheet material to suspend rotatable contact 80. Rotatable contact 80 forms an extremely sensitive sensor for the detection of sheet material at bar stop 54. Such detectors are known to the art and have found use on printing presses. Briefly, the passage of a sheet along support plate 57 causes contact 80 to be rotated upwards to break contact with the plate 78 thereby indicating the presence of a sheet. In the absence of a sheet, contact 80 is not activated. The sheet detector may comprise other means such as photoelectric sensors; however, the disclosed mechanism is preferred since it has provided a reliable sensor in the paper industry.

With continuing reference to FIG. 3, stationary shaft 82 is mounted to suitable side frames (not shown) of infeed assembly 24 and provides a mounting support for brackets 84a, 84b, 84c, 84d which in turn support mounting bars 85a, 85b, 85c, 85d which extend upstream and support pressure rollers 88a, 88b, 88c, 88d which are positioned to engage the surface of sheet 48 and apply positive pressure thereto; and to hold brush rollers 90a, 90b which are positioned to engage trailing edge 48b to prevent sheet 48 from backing up.

With reference to FIGS. 4 and 5, plate 90 of side guide register assembly 62 is mounted to slidable register bar 60. Arm 96 extends from register bar 60 through an opening in support plate 57 and is attached by fastener 97 to rod 98. Rod 98 is spring loaded by spring 102 between bracket 99 and collar 104 to continuously engage inclined face 107 of reciprocating lever 106 to cause register bar 60 to reciprocate inwardly and outwardly thereby shifting sheet 48 sidewards to a predetermined registered position as determined by the position of side guide register assembly 62 on register bar 60 and the setting of screw 94.

Input feed assembly 24 continuously receives sheet material in shingled, overlapping relationship and provides longitudinal registration of the leading edge of the first sheet by stop bar 54. Stop bar 54 is raised and lowered by the oscillatory motion imparted to shaft 72 by the operation of lever 74 so that stop bar 54 and drop bar 64 are operated simultaneously. Drop bar 64 is dropped into position immediately above the surface of the sheet to prevent it from buckling as it is side registered. Drop bar 64 is lowered prior to the actuation of guide register 62 by the rocking movement of arm 100 in a vertical direction about pin 102. Arm 164, mounted to pin 167, then oscillates to operate lever 106 to side register the sheet. Arm 100 is operated in timed relation to the reciprocating motion of the swing grippers as will be more fully described hereinafter. Briefly, as the swing grippers are moving one sheet into place on the vacuum drum, the side guide and stop bar are activated to simultaneously side register the sheet and stop its forward motion in a registered forward position.

Figure 6:
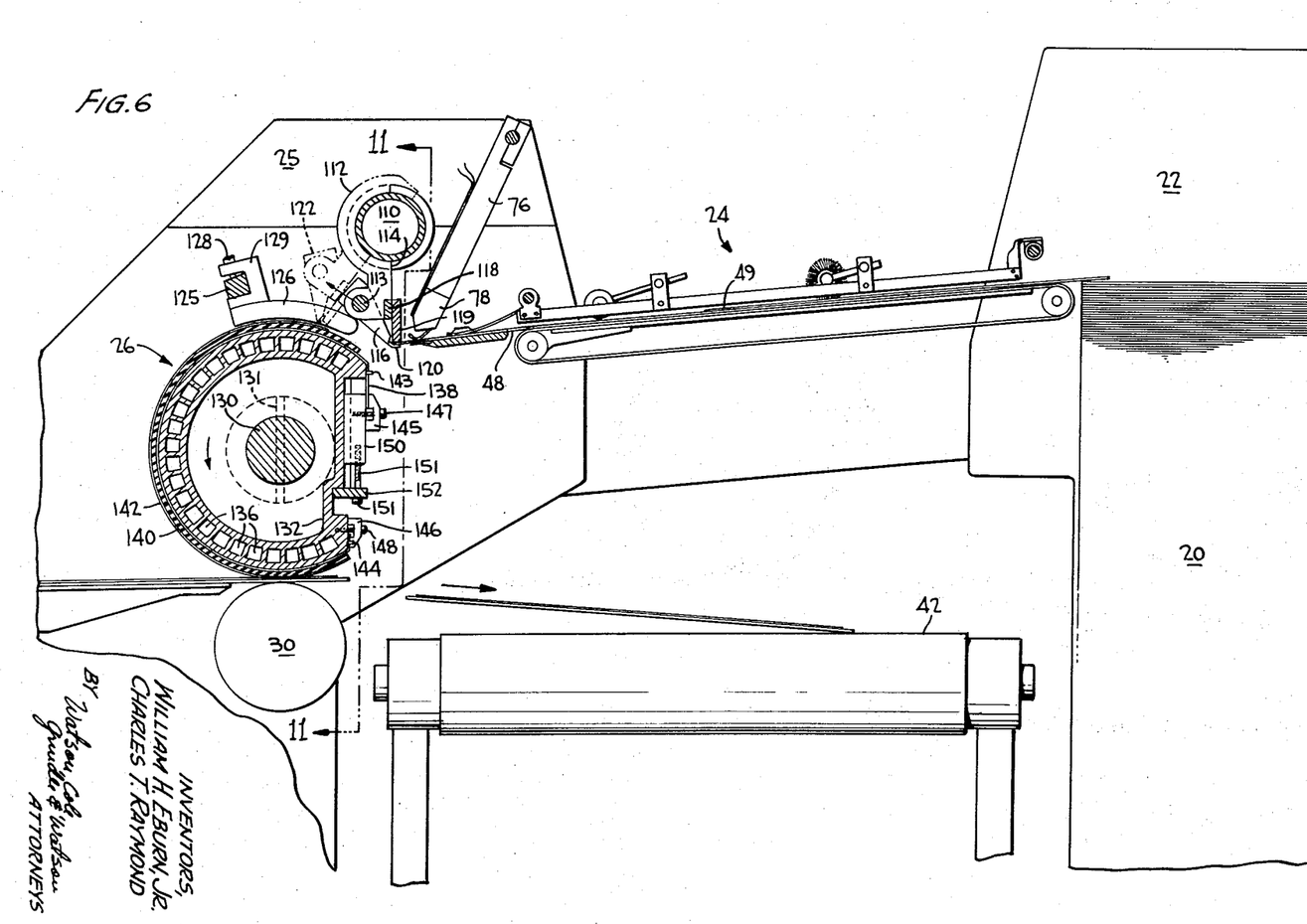
FIG. 6 is a sectional view of the sheet infeed, vacuum cylinder, swing gripper assembly and the combining roller taken along section 6—6 of FIG. 2.

The basic structure of vacuum drum 26, swing gripper assembly 25, their respective operative relationships with each other, and the operative relationship of swing gripper assembly 25 with infeed assembly 24 is best described with reference to FIGS. 6 and 11. The components in FIG. 6 are positioned just after the swing gripper fingers 120 have engaged the leading edge of the sheet. Shaft 110 is rotatably mounted by bearing 111 mounted to suitable side frame members (reference FIG. 11). Semi-circular supports 112 are mounted to rotatable shaft 110 and support shaft 113 in extension arms 114 to hold finger gripper assemblies 116. Toe plate 118 supports stop plate 119 on each finger assembly and provides a gripping surface opposed to finger element 120. Shaft 110 is oscillated in a controlled rocking motion, by means which will be more fully described hereinafter, to cause shaft 113 and finger gripper assembly 116 to reciprocate between the position shown in solid lines to the position represented in phantom by dotted lines 122. The aforedescribed reciprocating motion is timed with the positioning of sheet material against stop bar 54, so that after the sheets have been side registered, swing gripper assemblies 116 are moved forward, their respective fingers 120 closed against stop plates 119 to firmly grasp the leading edge of the material and deposit it, with the backward swing of the gripper assemblies, onto the surface of vacuum drum 26. Transversely extending bar 125 supports a plurality of sheet guides 126, by means of brackets 127 and fasteners 128, to further guide the sheet material onto the drum surface.

The rearward motion (clockwise rotation) of the finger assembly causes the leading edge of the sheet material to be brought proximate to the surface of vacuum drum 26; the speed of the counter-clockwise rotation being such that a uniform acceleration is provided from rest to the speed at which vacuum drum 26 is rotating.

With continuing reference to FIG. 6, semi-circularly shaped vacuum cylinder 26 includes central support member 132 which is mounted to shaft 130 by removable pin 131. Frame 132 is provided with a plurality of spaced channels 136 extending along the longitudinal axis of the vacuum drum. Frame 132 is covered by semi-flexible stainless steel sheet 138 on which is mounted rubber blanket 140 which forms the surface on which sheet material 142 is held and transported from swing gripper assembly 25 to the surface of the board material.

Semi-flexible sheet 138 is removably mounted to frame 132 over registration pins 143, 144 and securely fastened by brackets 145, 146 and fasteners 147, 148 to provide means for readily mounting thereon different sized rubber blankets. The rubber blankets are cut to be essentially the same width as the sheet material which is being fed to the vacuum drum. In actual practice, it may be preferable that the rubber blankets are slightly smaller in width by approximately 1/16 of an inch than the width and length of the sheet material. Block 150 is slidably mounted to frame 132 so that the tension on semi-flexible sheet 138 can be increased or decreased by means of threaded bolt 151 which engages support 152.

Figure 7:
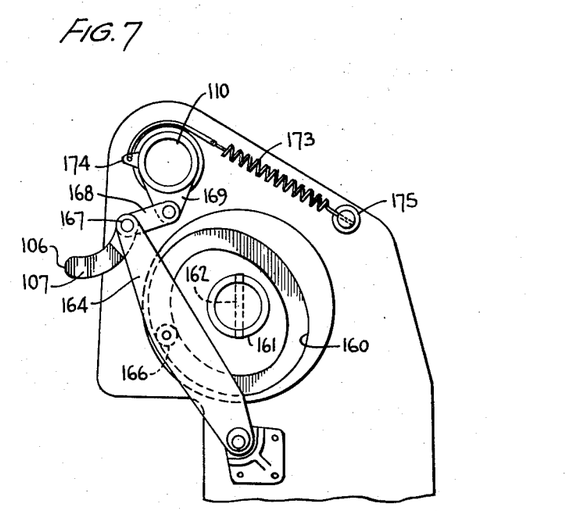
FIG. 7 is a side view of the swing gripper shaft actuator.

Referring to FIG. 7, the reciprocating clockwise and counter-clockwise movement of shaft 110 is produced by closed-track cam 160 which is mounted by pin 161 to shaft 162 which is supported by side frame members and rotated by being geared to the main drive shaft. Cam 160 operates cast arm 164 via cam follower 166 which is mounted to the approximate center of arm 164 to ride in cam track 160. As shaft 161 rotates a reciprocating motion is applied to the upper end of arm 164 and to pin 167 which connects link 168 to bell crank 169 which is mounted to shaft 110. Cam track 160 is shaped so that shaft 110 is accelerated with the finger grippers holding the paper from complete rest up to the rotational speed of vacuum drum 26. The acceleration of shaft 110 is further controlled so that it is accelerated to a greater speed than the rotation of the vacuum drum to enable the swing grippers to release the sheet, as their finger assemblies are opened, and accelerate out of the path of the now rotating sheet.

Spring 173 is mounted to shaft 110 at 174 and to the machine frame at 175 to provide a positive tension on the shaft and thereby eliminate any free motion of shaft 110 which may occur primarily because of part wearage; and also prevents motion when the shaft is at rest between its counter-rotative movements. Mount 176 secures the bottom end of arm 164 by means of eccentric 176 so that arm 164 and shaft 110 may be precisely adjusted to register the swing grippers relative to the blanket on the vacuum drum.

Figure 8:
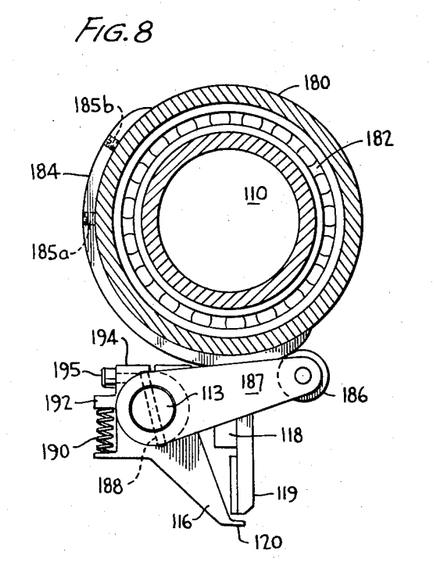
FIG. 8 is a sectional view of swing gripper cam assembly taken along section 8—8 of FIG. 11.

The structure for opening and closing the fingers of the swing grippers in timed relation to the feeding of sheet material and to the rotation of the vacuum drum is illustrated in FIG. 8. Hollow shaft 180 is rotatably mounted over counter-reciprocating shaft 110 by means of bearing 182 (only one bearing is shown, another bearing is located at the other end of the shaft) and cam 184 is secured on the outer surface of shaft 180 by means of set screws 185a, 185b. Cam follower 186 rides on cam 184 to operate bell crank 188 which is mounted to shaft 113 by pin 187.

Figure 10:
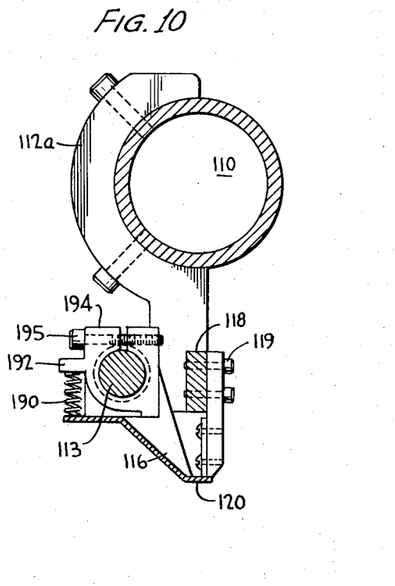
FIG. 10 illustrates a typical finger gripper assembly taken along section 10—10 of FIG. 11.

With additional reference to FIG. 10, finger assembly 116 is spring loaded in a closed position by spring 190 which bears against flange 192 on bell crank 187. Finger assembly 116 is secured to shaft 113 by split mount 194 and retained by fastener 195. The reciprocation of shaft 180 is selected to cause finger 120 to open twice during each cycle (a cycle being defined as one complete revolution of cam follower 164 in cam track 160, reference FIG. 7, to enable the swing gripper assemblies to grasp a sheet, place it on the drum and return to pick up another sheet). The timing of the finger operation may be adjustable by rotating cam 184 with respect to shaft 180. The position of finger 120 is adjustable by loosening split mount 194 and rotating finger assembly 116 on shaft 113, as previously described.

Figure 9:
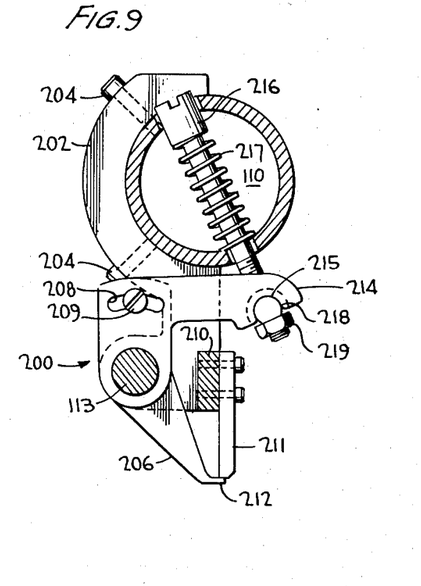
FIG. 9 is a cross section along lines 9—9 of FIG. 11 illustrating the master finger gripper assembly.

Master gripper assembly 200, shown in FIG. 9, is mounted in the center of shaft 113 and provides a means for adjusting the tension of fingers 120 on the individual gripper assemblies 116. Master gripper assembly 200 is secured to shaft 110 by mount 202 and screws 204. Assembly 200 comprises finger assembly 206 which is mounted to shaft 113 and includes arcuate slot 208 to accommodate screw 209. Toe plate 210, plate 211 and finger 212 are similar to the previously described parts of finger assembly 116. Screw 209 threadably engages arm 214 which includes socket joint 215. Threaded bolt 216 is spring loaded by spring 217 and engages socket 215 of arm 214 by ball 218 and is secured by nut 219. Spring loaded nut 216 provides a positive clamping pressure for finger 212 against the bottom surface of plate 211.

In setting-up the finger gripper tension, fingers 212 are adjusted to lie pressed to plate 211 by adjusting arm 214 in arcuate slot 208. A feeler gauge is then inserted between finger 212 and plate stop 211. Each of the other gripper assemblies 116 is rotated about shaft 113 until fingers 120 come into contact with their respective stop plates 119. Removal of the feeler gauge from the master gripper assembly 200 allows each of the individual fingers 120 to depress its spring 190 and become spring loaded for even tension across swing gripper assembly 25.

Figures 11, 11A:
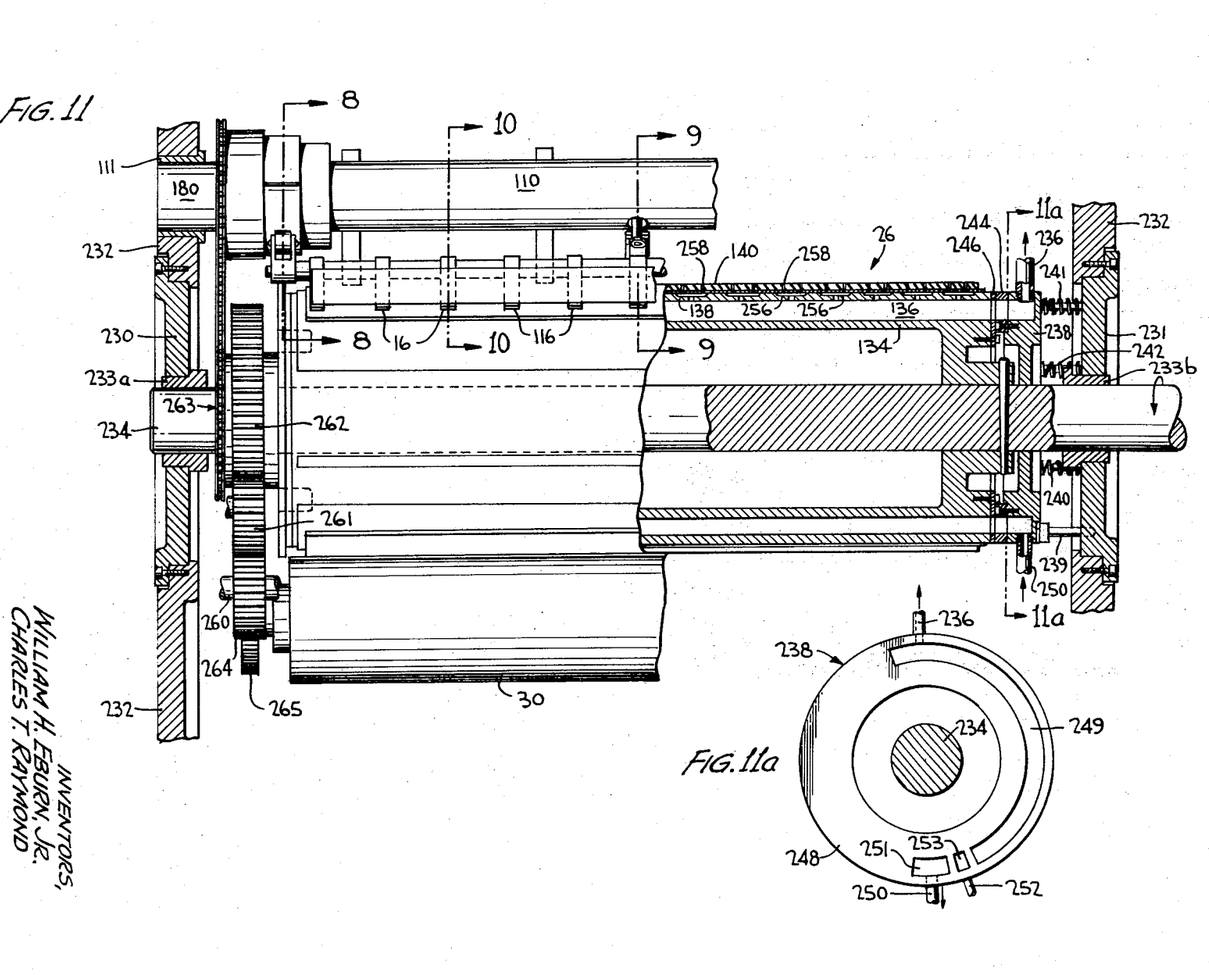
FIG. 11 is a partial cut-away, sectional view taken along lines 11—11 of FIG. 6 showing details of the vacuum cylinder, manifold assembly, and the power drive for the vacuum cylinder and the swing gripper drive shaft.
FIG. 11a is a cross section taken along lines 11a—11a of FIG. 11 of the cylinder manifold.

With reference to FIG. 11, removable plates 230, 231 are mounted to each side, respectively, of machine frame 232 to provide easy access to vacuum drum 26 for the removal or replacement of parts. The separate assembly consisting of removable plates 230, 231 thereby provides a simple means for gaining access to the vacuum drum and its respective parts without the necessity of disassembling one or both sides of the frame. The removable plates 230, 231 are each provided with bearings 233a, 233b to mount rotatable shaft 234 which supports vacuum drum 26.

Sheet material is firmly held in precise registration on rubber blanket 140 of vacuum drum 26 by means of a vacuum which is created by the suction of air out of port 236 in manifold 238 by a vacuum pump which is not shown for the purposes of clarity. Manifold 238 is prevented from rotating with shaft 234 and vacuum drum 26 by stop bolt 239 which is mounted to the manifold and to side plate 231 and is constructed so that vacuum is applied to selected ones of channels 136 extending around the interior of frame 134.

Springs 240, 241, 242 around the circumference of manifold 238 apply pressure to hold wear plate 244 in tight proximity to wear plate 246 on vacuum cylinder 26. Wear plate 244 is preferably made of Delrin and wear plate 246 is preferably chrome still to insure a tight seal between the cylinder and the manifold to maintain vacuum pressure within the cylinder.

Manifold 238 is shown in detail in FIG. 11a and consists of an aluminum housing 248 with a semi-circular channel 249 connected to exit port 236 and a vacuum source. Port 250 provides a positive pressure to chamber 251 and port 252 is exposed to atmosphere to provide atmospheric pressure to chamber 253.

As vacuum cylinder 26 rotates in the direction indicated on shaft 234, the respective ports of channels 136 (see FIG. 6) are successively exposed to a vacuum, atmosphere and positive blow-off pressure as they pass by channel 249, chamber 252 and chamber 251. The position of chamber 251 is at the bottom of manifold 238 so that the sheet material attached to the drum 26 is released as the drum rotates to roll the sheet material onto the surface of the board material. At this point, the sheet and board are being pressed between vacuum drum 26 and pressure roller 30 (see FIGS. 1 and 6).

With continuing reference to FIG. 11, each channel 136 commuicates with a plurality of apertures 256 via connecting ducts 257 in frame 134. Semi-flexible sheet 138 is perforated with a plurality of elongated apertures which are spaced and located to be in communication with apertures 256 when semi-flexible sheet 138 is attached to vacuum drum 26 as previously disclosed. The air passage through the drum to its exterior surface is completed by holes 258 which are drilled or punched through rubber blanket 140.

In actual practice, it is preferable to mount rubber blankets 140 to semi-flexible sheet 138 in registered position with respect to the slots in the flexible sheet which engage pins 143 to register the sheet on the drum (see FIG. 6) and then drill or punch the holes in the rubber blanket. It is also preferable to assemble one size blanket on separate semi-flexible sheets to accommodate each different size of sheet material which is to be combined with a given baseboard.

Also shown in FIG. 11 is shaft 110, shaft 113 and the plurality of swing gripper assemblies 116 which are suspended therefrom across the vacuum drum. To the left of FIG. 6 is illustrated main power shaft 260, gear 261 connected/thereto and which meshes with gear 262 to drive shaft 234 and the vacuum drum. Chain 263 is driven by a sprocket (not shown) on shaft 234 to turn hollow shaft 180 to provide actuation of the finger gripper mechanisms previously described. Main drive shaft gear 264 meshes with gear 265 to provide rotative energy to the glue assembly; final glue roller 266 being shown in contact with a sheet on vacuum drum 26.

Figure 12:
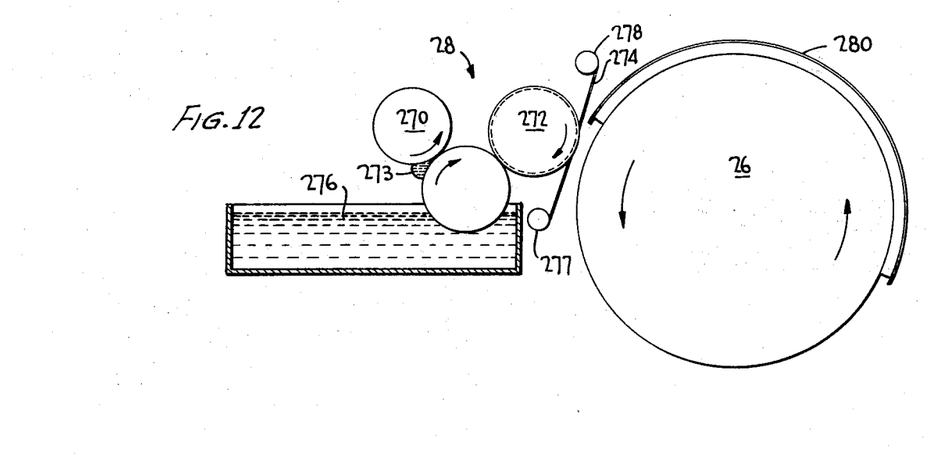
FIG. 12 illustrates the glue tank, glue roller assembly and vacuum cylinder in cross section taken through lines 12—12 of FIG. 2.

Glue roller assembly 28 and its relationship with vacuum drum 26 are shown in FIG. 12. Glue roller assembly 28 essentially comprises rollers 270, 271, 272 and wire pick-off 274. Glue is fed from a tank supply (not shown) into glue tank 276. The glue level in tank 276 may be automatically controlled by any level sensing means which are known to the art, or may be manually controlled by an operator so as to insure that it is high enough to contact and be picked up by roller 271. Roller 271 is driven from the main drive shaft (see FIG. 12) in a clockwise direction and roller 270 is driven contra to roller 271 in a counterclockwise direction at a much slower surface speed and is spaced from the periphery of roller 271 to provide a thin layer of adhesive on the surface of roller 271. Roller 270 may preferably be mounted so that the clearance between it and roller 271 may be adjusted to vary the depth or thickness of the adhesive film. Such means are not illustrated in FIG. 12 as they are well known to those having skill in the art. Because of the small clearance between the rollers 270 and 271, a cusp 273 of adhesive is formed as shown.

Roller 272 is mounted to be rotated clockwise and to be tangent to the surface of roller 271 to pick up a layer of adhesive on its surface. Roller 272 is provided with a number of spaced circumferential slits or grooves extending along its length. Wires 274 are suspended from supports 277, 278 in each of these grooves so that each of the wires lies just below the surface of roller 272. Adhesive is applied from the surface of roller 272 to the surface of sheet material 280 held to vacuum drum 26 by the vacuum system previously described. Taut wires 274 prevent sheet material 280 from becoming disengaged from vacuum drum 26 and attached to the surface of roller 272 due to the inherent tackiness of the adhesive thereon. As vacuum drum 26 rotates counterclockwise the leading edge of sheet material 280 comes into contact with the surface of roller 272 and, then as the drum continues to rotate, the leading edge is prevented from adhering to the surface of the roller by its engagement with the taut wires.

The thickness of the layer of adhesive which is transferred to the surface of roller 272 from roller 271 is of some significance in that this thickness must be controlled to the extent that a bead of glue is not formed on wires 274 from the accumulation of glue in the grooves of roller 272. If glue were allowed to accumulate in these grooves, the resulting beads formed on wires 274 would be transferred to the sheet material and even to the underlying blanket which may lead to unwanted problems.

Figures 3A, 13:
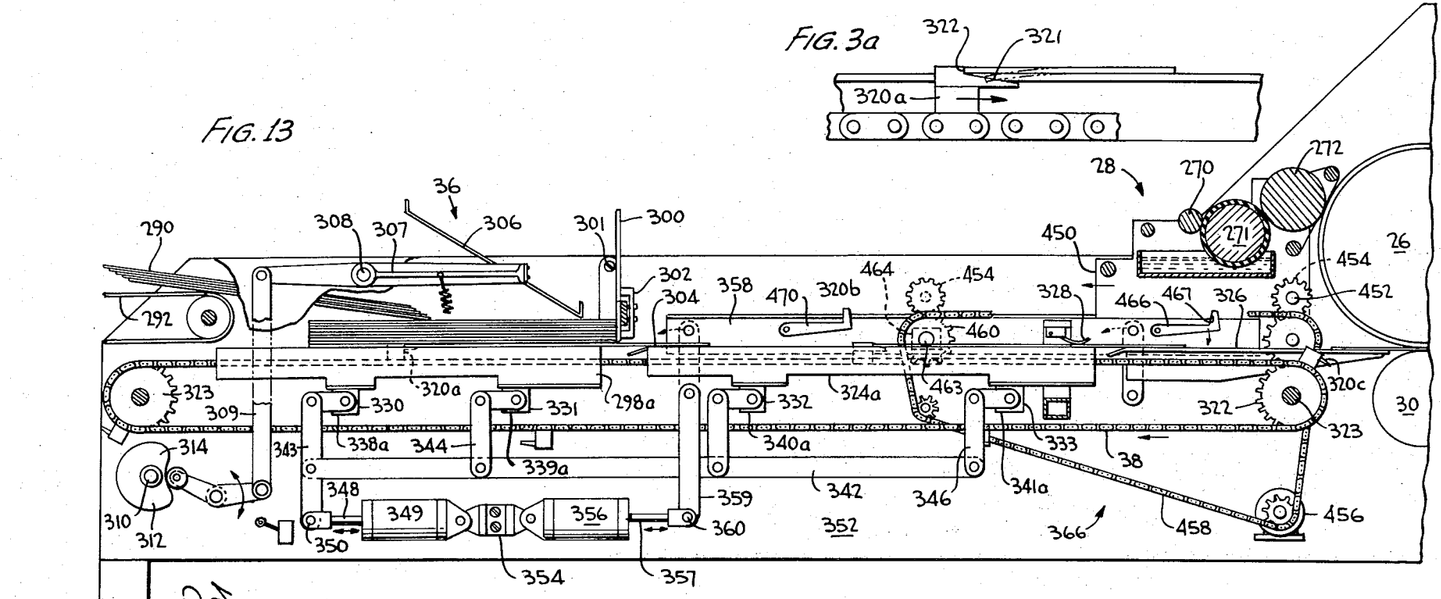
FIG. 13 illustrates the board infeed conveyors, the board storage hopper and board height sensor, the chain drive and lug pusher elements, and the cylinders for activating the board elevator assembly as shown in cross section through lines 13—13 of FIG. 2.

The operating structure for feeding baseboard material between pressure roller 30 and vacuum drum 26 is illustrated in FIG. 13. Baseboards 290 are transported on endless conveyor 292, where they have been placed, either automatically or by hand, in shingled, overlapping relationship, and temporarily stored in hopper 36 from which individual boards are carried in timed relationship with infeed assembly 24 (FIG. 1).

With continuing reference to FIG. 13, and additional reference to FIG. 2, hopper 36 is formed by bottom rails 298a, 298b, 298c, 298d and stop board 300 which serves to stop the forward motion of baseboards 290 as they are dumped from endless conveyor 292. The hopper also includes side frame members, which are not illustrated for purposes of preserving clarity, to aid in forming a vertical stack of baseboards within the hopper. Stop board 300 is slidably mounted to a side frame of the hopper by flange 301 and bracket mount 302 to provide an adjustable clearance between the bottom of board stop 300 and the top surface of rails 298a–298d to release only one baseboard at a time from the hopper, as illustrated by board 304 which is just emerging from the hopper.

Hopper 36 is provided with a sensor mechanism to control the height of the stack of boards which includes pressure guide 306 fixedly mounted to rotatable arm 307 secured to a side member of the hopper at pin 308. Link 309 interconnects an end of swingable arm 307 to linkage 310 which has mounted thereon cam follower 311 engaging cam 312 which is driven by shaft 313 in synchronization with the combiner apparatus so that it rotates once each cycle. Lobe 314 on cam 312 thereby engages cam follower 311 once each cycle to pivot arm 307 downward so that pressure guide 306 "feels" for the surface of the topmost board in the hopper. If the stack of boards is too low, pressure guide 306 travels downward to such an extent that link 310a engages and activates microswitch 316 which is mounted to the side frame of the apparatus. Microswitch 316 activates endless conveyor 292 to deliver an additional supply of baseboards to the hopper. If the vertical stack in hopper 36 is high enough, microswitch 316 is not actuated and the endless conveyor is not actuated. In actual practice, the actuation of the endless conveyor may be timed to turn off a fixed period of time after it is actuated so that a number of boards are fed into hopper 36.

Pressure guide 306 also serves to apply pressure to the stacked boards to insure that the bottommost board will be picked up and pushed out of the hopper by means which are now to be described.

Endless chain 38 is synchronously driven by drive sprocket 322 around idler sprocket 323 in a clockwise direction and is provided with suitably spaced pusher lugs 320a, 320b, 320c, etc. Endless chain 38a is also driven by a similar drive sprocket on the other side of the machine. The operation of only one chain will be described as the operation of the other chain is the same. The rotation of endless chain 38 causes pusher lug 320a (and its counterpart mounted directly opposite it on chain 38a) to engage the bottom of the stack of boards, thereby slightly lifting them, and push the bottom board 304 out of the hopper onto rails 324a–324d which extend longitudinally from hopper 36 to platform 326 positioned downstream from pressure roller 30.

As shown in FIG. 13a, the pusher elements have a construction which considerably aids their function of lifting the rearward portion of the stacked boards so that only the rearward edge of the bottommost board of the stack is engaged by the pusher lug. Pusher lug 320a is provided with arcuately inclined ramp 321 which culminates at stepped face 322. Inclined ramp 321 controllably lifts the back portion of the stack, and its simultaneous forward motion causes the bottommost board to begin forward motion through the clearance provided by stop board 300. Stepped face 322 is then free to slip under the remaining boards to engage the trailing edge of the bottommost board and transport it toward platform 326.

Sprocket 322 is driven by a variable drive mechanism which controls the speed of chains 38, 38a so that the chains, and pusher lugs mounted thereon, are slowed down just before the pusher lugs engage the board in the hopper and also as each of the pusher lugs approaches a drive sprocket, for example, drive sprocket 322. This prevents the pusher lugs from damaging the trailing edges of the boards during initial engagement in the hopper, and also enables the lugs on chain 38, for example, to radius around sprocket 322 without digging into the board as it is drawn between pressure roller 30 and vacuum drum 26. The vari-drive mechanism is described more fully hereinafter.

The board infeed also includes an elevator assembly to interrupt the board feed in the event that sensor 328 fails to sense a board passing underneath its station. As described previously, the board feel is also interrupted in the absence of sheet material being fed to infeed assembly 24. The elevator assembly comprises hopper rails 298a–298d, conveyor rails 324a–324d which are respectively mounted to transverse supports 330, 331 and 332, 333, which in turn are pivotally supported to transverse shafts 334, 335, 336, 337 by connecting link pairs 338a–338b, 339a–339b, 340a–340b, 341a–341b. Connecting bar 342 interconnects links 343, 344, 345, 346 to the connecting links as illustrated in FIG. 13; link 343 extending to shaft 348 of air cylinder 349 and connected thereto by connector 350. Air cylinder 349 is mounted to side frame 352 by mounting bracket 354 and is activated by board sensor 328 and sheet sensor 80 to elevate hopper rails 298a–298d and conveyor rails 324a–324d, thereby lifting both the vertically stacked boards in the hopper and the boards on the conveyor out of engagement with the pusher lugs.

Figure 16:
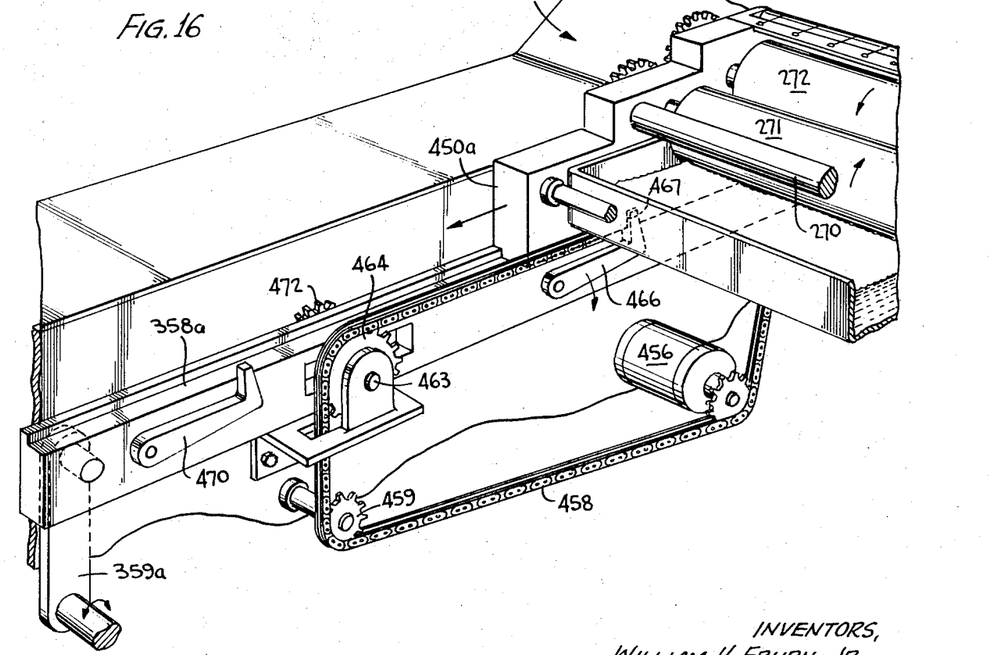
FIG. 16 is a perspective view of the mounting assembly for the glue rollers and the drive for withdrawing the glue rollers from the vacuum cylinder.

Air cylinder 356 is also mounted to side frame 352 by mounting bracket 354 and its shaft 357 is connected to glue assembly rail 358 via link 359 and connector 360. Air cylinder 356 is also activated by the aforementioned sensor mechanisms to move rail 358 a very small distance backward (to the left in FIG. 13) to withdraw glue roller assembly 28 (FIG. 1) from vacuum drum 26 to disengage final glue roller 272 from contact with the surface of the vacuum drum. The mounting of glue roller assembly 28 to rail 358 is shown in FIG. 16 and the structure of glue roller withdrawal assembly 366 will be described more fully hereinafter with the description of FIG. 16.

The boards are urged against guide rail 367 by clip springs 368a, 368b mounted to side rail 369 to provide transferse alignment and registration with respect to vacuum drum 26. Guide rail 367 is preferably mounted to be adjusted laterally to provide a range of registered positions to accommodate variously sized baseboards.

Drive sprocket 322 (and its counterpart on chain 38a) is mounted to shaft 323 by a slip coupling so that chain 38 may be advanced or retarded with respect to shaft 323 to provide means for registering the boards along the feed axis so that they will be in alignment with the sheet material on the vacuum drum. Actually, the aforedescribed registration is a course registration adjustment; the precision adjustments necessary to achieve extremely accurate registration of the sheet material to the boards will be described hereinafter.

Figures 14, 14A:
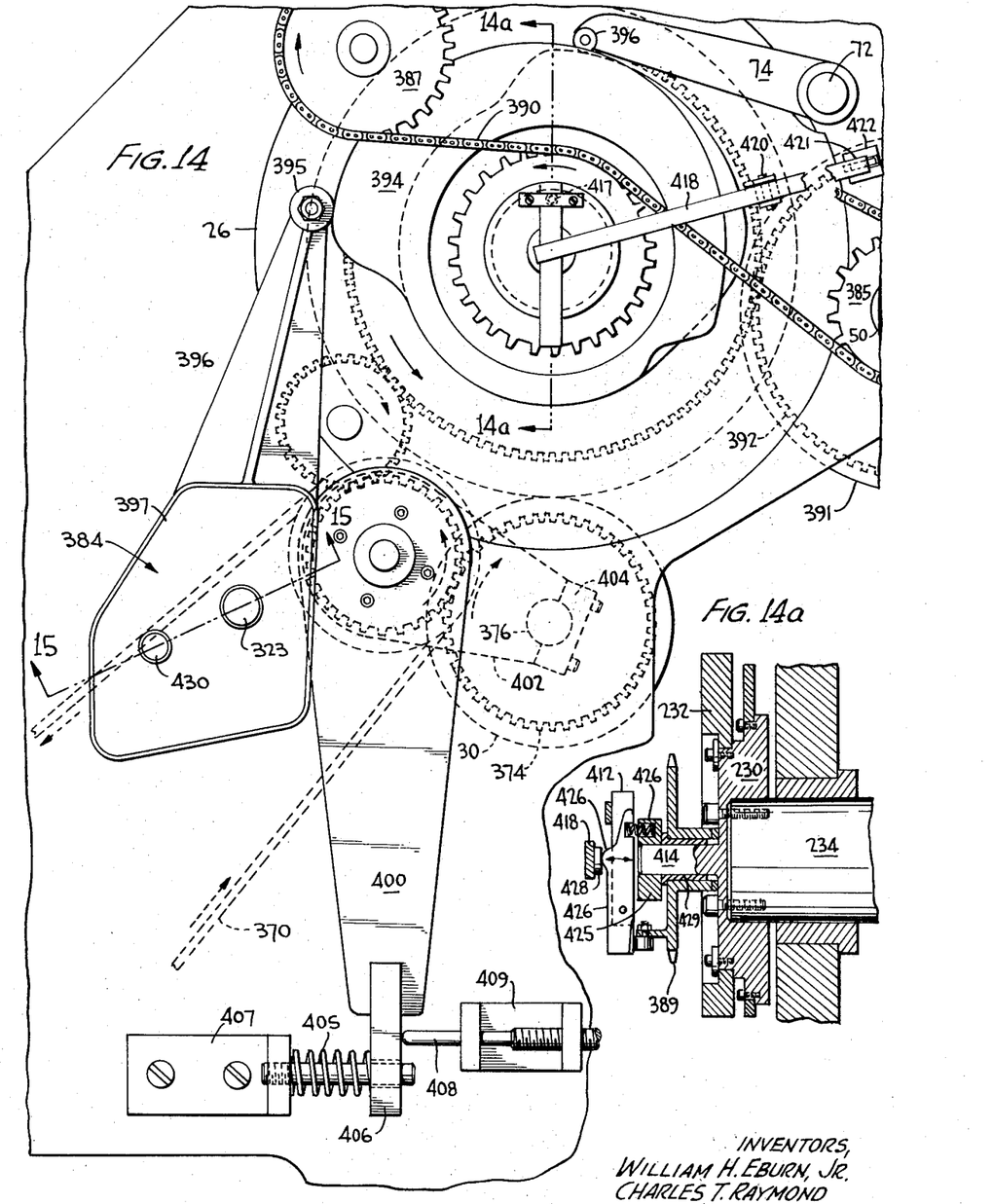
FIG. 14 is a side elevational view of the vari-drive assembly for the chain board infeed, the cam assemblies for the vari-driver and the front stop and guide register, and further illustrating the main drive shaft and its relationship to the vacuum cylinder drive, pressure roller drive, and the vari-drive power connections.
FIG. 14a illustrates the controller for synchronizing the operation of the sheet infeeder with the operation of the combiner apparatus by means of a cross section taken along lines 14a—14a of FIG. 14.

The drive assembly for the vacuum drum, vari-drive mechanism, pressure roller and swing gripper assembly is illustrated in FIG. 14. Main drive shaft 260 is driven from a sprocket mounted thereon (not shown) by belt 370 from variable speed motor 40 (reference FIG. 1) to provide power to main drive gear 372. Main drive gear 372 meshes with gear 374 on shaft 376 to rotate pressure roller 30 and also engages idler gear 378 on stub shaft 380 to rotate vacuum drum 26 by means of gear 382 which is mounted to shaft 234 (reference FIG. 11). Main drive gear 372 also engages a gear in vari-drive assembly 384 which will be more fully described hereinafter. The previously mentioned gears are driven to rotate as shown in FIG. 14, i.e., main drive gear rotates counterclockwise, gear 374 rotates clockwise, idler gear 378 rotates clockwise and gear 382 rotates counterclockwise, to provide the correct rotation to pressure roller 30, vacuum drum 26 and the gear assembly within vari-drive assembly 384.

Cam 392 and cam 394 are rotatably mounted to vacuum drum shaft 234; cam 392 engaging cam follower 396 on drop lever 74 to activate stop bar 54 and drop bar 64 as previously described with reference to FIG. 3. Cam 394 is engaged by cam follower 395 to operate arm 396 to move vari-drive housing 397. In actual practice, lever 74 may be spring-loaded to provide positive engagement of cam follower 396 with cam 392. Similarly, vari-drive housing 397 is preferably spring-loaded to provide a positive engagement of cam follower 395 with cam 394.

Arm 400 is rotatably mounted by bearings (not shown) to shaft 260 and includes extension 402 which carries pressure roller shaft 376 by split mount 404. Arm 400 is spring-loaded, by the engagement of spring 405 with bracket 406 and mounting support 407, against rod 408 which threadably engages mounting bracket 409 to provide a means for altering the contact pressure of pressure roller 30 with the boards and the surface of vacuum drum 26. A wing nut assembly (not shown) is provided to turn rod 408 to move arm 400 either to the left or right to rotate extension 402 thereby either decreasing or increasing, respectively, the pressure exerted by pressure roller 30 on the board and sheet material which are combined between it and vacuum drum 26.

Flange 412 is mounted to stub shaft 414, which is extended from vacuum drum shaft 234 (reference FIG. 14a), and includes T-shaped cam follower 416 which is pivotally mounted to flange 412 at 417. Lever arm 418 is attached to cam follower 416 at 419 and is pivotally mounted by support 420 to have contact 421 in operable association with microswitch 422. Sprocket 385 is mounted on shaft 50 (reference FIG. 3), shaft 50 extending across the width of the machine where, on the other side, it carries an additional sprocket to drive link-chain 386 which is connected to provide a synchronized drive input for sheet feeder 22 (reference FIG. 2). Continuing with FIG. 14, idler sprocket 387 is supported by shaft 388 and sprocket 389 is mounted to rotate freely on stub shaft 414. Timing link-chain 390 is carried by the aforementioned sprockets to synchronize the operation of electric clutch 392 which controls the rotation of shaft 50. Gear 391 within clutch 392 is driven from gear 382 on vacuum drum shaft 234. Gear 391 engages an idler gear within clutch 392.

Sheet feeder 22 is engaged and synchronized with the rotation of vacuum drum 26 in the following manner. A sheet feeder engage lever, which is mounted on a conveniently located operating panel, is shifted into a sheet feeding mode position and held there until microswitch 422 is activated by the aforedescribed operation. The activation of microswitch 422 engages electric clutch 390 and power is applied to rotate shaft 50 and, via link chain 386, drive sheet feeder 22 in timed relationship with vacuum drum 26 and the combining apparatus. Linkchain 390 references electric clutch 392 to the vacuum drum shaft 234.

With reference to FIG. 14a, flange 412 is provided with cam surface 425 having cam knob 426. Flange 412 is mounted to stub shaft 414 by block 425 and is springloaded by spring 426 to provide positive engagement with cam follower 428 of lever arm 418. Shaft 414 rotates with vacuum drum shaft 234 and once each revolution of shaft 234, cam knob 426 engages cam follower 428 to pivot lever arm 418 and activate microswitch 422 as described above. Sprocket 389 is rotatable on stub shaft 414 by bearing 429.

As mentioned previously, vari-drive assembly 384 operates to slow down the board infeed chain just before the pusher lugs engage a board and also as a board enters between the pressure roller and the vacuum drum to enable the lugs to radius around the chain drive sprocket without damaging the boards. With reference to FIG. 14, vari-drive assembly 384 rotates about shaft 323 which drives the board feed sprockets. The vari-drive assembly is essentially a differential with a reduction of 4:5 and arm 396 is moved to the left and to the right as cam follower 395 tracks cam 394. Leftward rotation of vari-drive housing 397 causes shaft 323 to be slowed down and rightward motion of the housing causes shaft 323 to accelerate.

Figure 15:
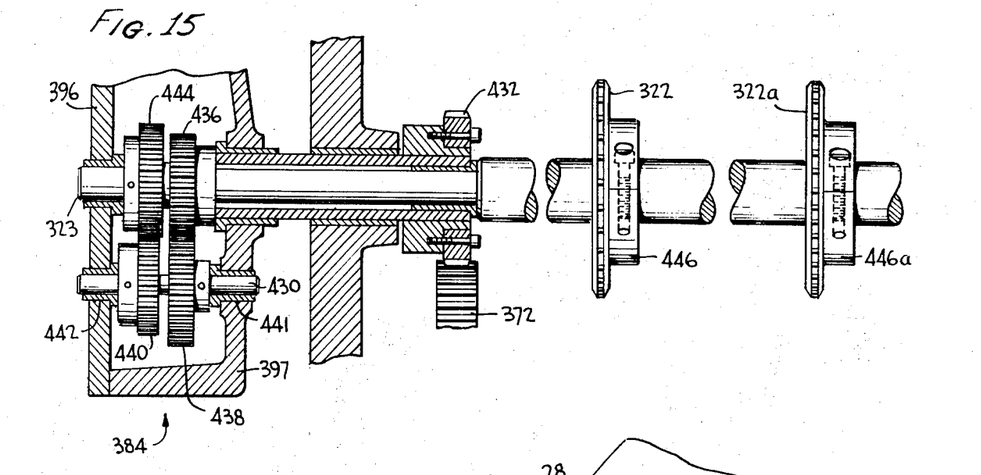
FIG. 15 illustrates the vari-drive assembly and its connection to the main drive, and the chain drive sprockets for the board infeed, in cross section along lines 15—15 of FIG. 14.

The internal structure of vari-drive assembly 384 and its interconnection with shaft 323 is illustrated in FIG. 15. Gear 432 is mounted on hollow shaft 434 which rotates on bearing 435 and is driven from main drive gear 372, gear 436 also mounted to hollow shaft 434 within housing 397. Gears 438 and 440 are carried by shaft 430 which is mounted by bearings 441, 442 in housing 397. Shaft 323 is driven by gear 444 mounted thereon and engaging gear 440. Sprockets 322 and 322a are mounted on shaft 323 to drive chains 38, 38a as previously described with reference to FIG. 13. Slip clutches 446, 446a enable sprockets 322, 322a, respectively, to be rotated to register the board infeed with the rotation of the vacuum drum.

The mounting of glue roller assembly 28 to glue roller withdrawal assembly 366 is best described with reference to FIG. 13 and 16 illustrating glue roller assembly 28 mounted to stepped mounts 450, 450a which are secured to glue assembly rails 358, 358a, respectively. Glue rollers 270, 271, 272 are driven by a gear assembly mounted to the far side of stepped block 450a as indicated in FIG. 16. For the purposes of this invention it is sufficient to note that the necessary gearing to establish the rotation of the glue rollers previously described is well known and, consequently, need not be elaborated upon. However, the input drive for such a gearing mechanism is provided from shaft 323 by means of a gear mounted thereon that meshes with a gear supported on shaft 452 and which engages gear 454 carried on shaft 455 of stepped blocks 450, 450a.

Gear motor 456 drives the glue roller assembly, when the combiner is either in an idle mode or is temporarily shut down, to prevent the glue from solidifying on the glue rollers. Link chain 458 runs over idler sprocket 459 to sprocket 460 and then passes over sprocket 461 to the gear motor. In the normal running mode, overriding clutches, which are mounted on shafts 322 and 461, enable the glue roller assembly to be driven through the previously described gear train to run in synchronism with the combiner apparatus. Gear motor 456 is then shut off through the electrical system which is also connected to turn the motor on again in an off mode or an idle mode.

Shaft 463, which carries sprocket 460 is connected to rail 358 through aperture 464 to provide clearance for the backward movement of rail 358 when glue assembly 28 is withdrawn from the vacuum drum. A similar aperture is provided in rail 358a on the opposite side of the machine. Locking lever 466 engages slot 467 on the bottom of block mount 450 so that the block mount and glue assembly are locked together to maintain the glue assembly on the drive gear and so that they move together with rails 358, 358a in the glue assembly withdraw mode. Disengagement of lever 466 from slot 467 enables glue roller assembly 28 to be moved on top of rails 358, 358a so that gear 454 meshes with gear 472 (reference FIG. 16). In this position, the glue roller assembly is locked in place by locking lever 470 and is driven from the gear motor by gear 472 which is carried on shaft 463 and in turn is driven by link chain 458. The glue roller assembly may be moved into this position to provide access to the vacuum drum, pressure roller, etc., as may be necessary for adjustments or maintenance.

Figure 17:
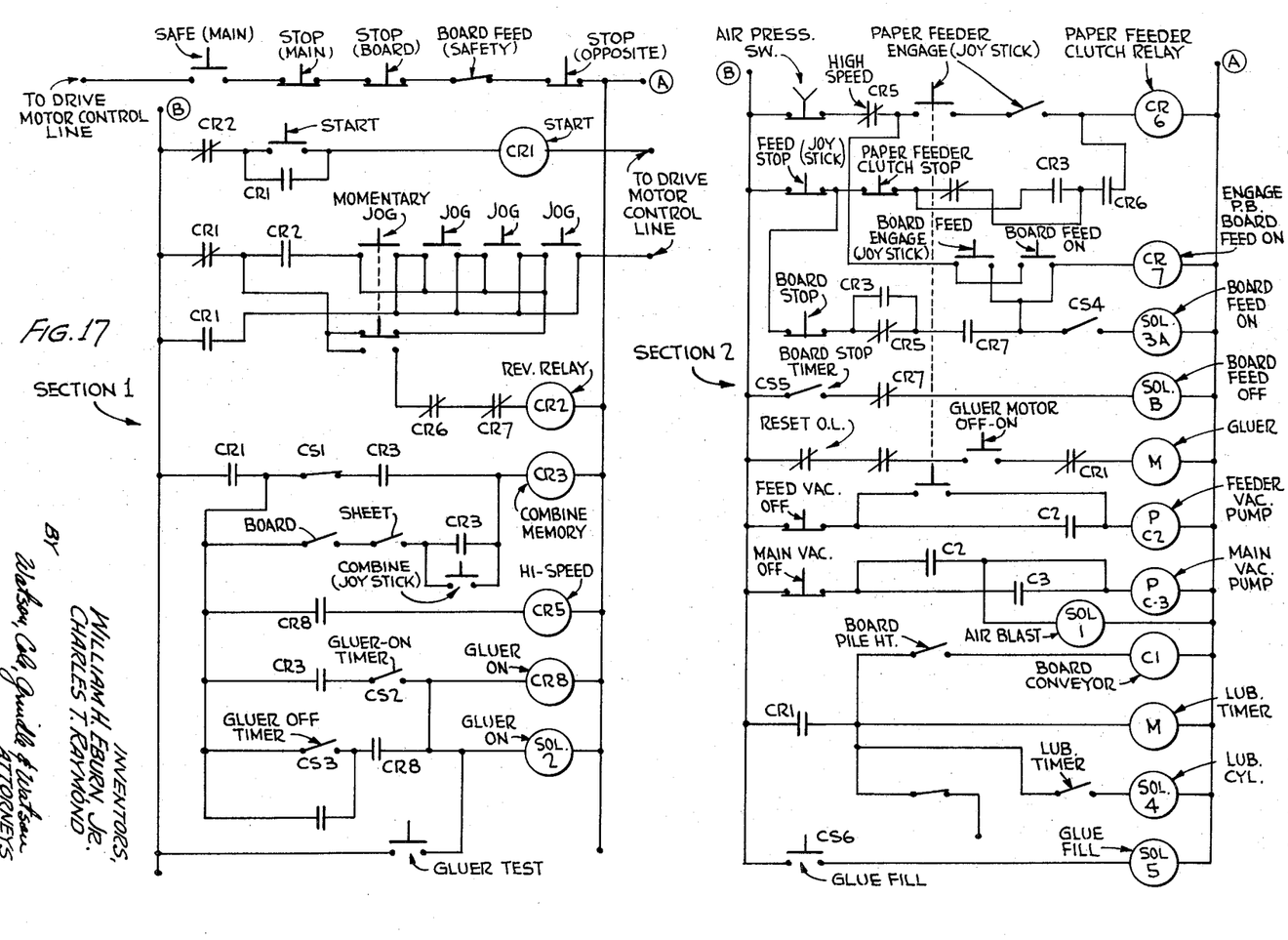
FIG. 17 is an electrical schematic showing the control system for the combiner apparatus.

The electrical control system for the combiner apparatus is illustrated in schematic form in FIG. 17. In this schematic, the pre-fix designation CS indicates a cam operated switch. The combining apparatus requires timing other than that which has previously been described, for example, to prevent the board elevator mechanism from being activated with a board just emerging from storage hopper 36. The combiner apparatus uses a Gemco cam operated switch unit 31 which is mounted to side frame 32a (reference FIG. 2) and driven from main drive shaft 260.

The jog switches shown in section 1 are manually operated and enable components of the combiner to be actuated and moved for testing, maintenance, etc. When the start switch is engaged, the machine automatically goes into an idle mode which is the only operating mode possible without an override.

The first steps in beginning a normal mode of operation are to start the feeding of sheets and boards. A four-position "joy stick" controller is mounted to a convenient panel and provides paper feed engage, board feed engage, combine, and feed stop controls. The "joy stick" is thrown into its paper feed engage position (section 2) which pulls in paper feeder clutch relay CR6 when microswitch 422 (FIG. 14) is activated only if there is air pressure, the machine is not in high speed, etc. Holding circuit consisting of CR3, CR5, CR6, paper feed clutch stop, and "joy stick" feed stop is then operable. A similar interlocking condition exists for the board feeder control. The paper feed may be stopped for example, by pushing the paper feed clutch stop. If the joy stick were placed in the feed stop position, both the paper feeder and the board feeder would be stopped.

Assuming that both paper and boards are being fed to the machine, the "joy stick" is thrown into the combine position and, if paper and boards are actually being fed, the board and sheet detector switches are closed; and combined memory relay CR3 latches in to put the machine into the combine mode. The gluer-on timer switch is set for a fixed period to allow glue to be rolled onto the final glue roller. When glue timer switch CS2 closes, gluer-on relay CR8 is activated and simultaneously therewith glue-on solenoid SO1 2 is also activated. Gluer-off timer switch CS3 is momentarily actuated after CS2, but the gluer does not stop operating unless relay CR3 opens, which may occur in the absence of either board or sheet feed, or by stopping the machine by one of the manual switches.

A gluer test switch is provided to activate solenoid 2 to check the clearance between the vacuum drum blanket before a run is made.

In section 2 the board height sensing circuit is provided so that the endless conveyor may be actuated to supply boards to the hopper when a low stack condition is indicated, providing that the start switch is engaged. The operation of the remaining feeder vacuum pump, main vacuum pump systems, etc. are ancillary and require no additional explanation for the purposes of this invention.

The following summary concerns the registration of the various components of the combiner apparatus to provide precise alignment of the sheet material on the surface of the baseboard material. From the foregoing description it is apparent that the registration of the sheet in infeed assembly 24 is critical since the rubber blanket position is fixed on vacuum drum 26. The preferred procedure of registering the combiner is to initially set the front stop 54 and side register guide assembly 62 to register the sheets to the blanket on the vacuum cylinder. In order to register the board to the sheet material, sprockets 322a, 322b are slipped on chain infeed shaft 323 to move the chain and the pusher lugs with respect to shaft 323 so that the board will arrive at the pressure roller in registration with the sheet on the vacuum drive to mate the sheet and board in the precise desired alignment. Side registration of the boards is accomplished by adjusting guide rail 367. After the foregoing board adjustment has been made as accurately as possible, minute adjustments, in the order of several thousandths of an inch, may be made by adjusting the position of front stop 54 and the side guide registration assembly 62 in infeed assembly 24. The magnitude of the latter adjustments is of course limited by the size of the blanket since the sheets must be placed on the vacuum drum to cover the blanket and prevent glue from being applied thereto.

It is important to maintain a vacuum within vacuum drum 26 that is adequate to maintain the sheet material securely on the rubber blanket and, for that purpose, the size of the orifices in the rubber blanket which are exposed to the atmosphere deserves some consideration. In brief, to maintain an optimum vacuum the ultimate hole area exposed to the atmosphere should be extremely low so that, in the particular instance, should the rubber blanket become exposed to the atmosphere for any reason, such as a sheet misfeed, the vacuum will not be lost. Conversely, large holes are desirable to get more surface exposed to provide a greater holddown force (for positive sheet hang-on). Consequently, a compromise is obviously required between these two objectives. However, an interesting phenomenon takes place around the individual blanket holes when it is holding a sheet of material. Specifically, the leakage around each hole provides an effective increase in the actual hole area to provide more hang-on suction. Therefore, the actual hole area can be decreased to insure that vacuum is maintained in the event of exposure of the blanket to the atmosphere. In practice, the holes in the blanket are seventy-thousandths of an inch in diameter; however, it has been found advantageous to provide several rows of holes of ninety-eight thousandths of an inch across the blanket where the leading edge of the sheet is deposited by the swing grippers to increase the hold-on pressure at that position.

Those skilled in the art will recognize other modifications of the apparatus. While preferred embodiments of the invention have been shown and described, it will be apparent that changes may be made without departing from the principles and spirit of the invention, the scope of which is defined by the appended claims. Accordingly, the foregoing embodiments are to be considered illustrative only, rather than restrictive of the invention, and those modifications which come within the meaning and range of equivalency of the claims are to be included.

What is claimed is:

1. Apparatus for combining two sets of sheet material, comprising;
   first means for feeding individual sheets of a first sheet material,
   said first means including means to initially register said individual sheets in two orthogonal directions,
   second means for feeding individual sheets of a second sheet material,
   means for transporting said first individual sheets from a first registered position to a second registered position,
   said means for transporting including means rotating about a fixed axis, means reciprocating between said first means and said means for rotating to transport said individual sheets to said rotating means at said second registered position, and means for controlling to move said reciprocating means from a position of rest at said first means to a linear speed substantially equal to the speed of rotation of said means for rotating and for accelerating said reciprocating means subsequent to the delivery of said individual sheets at said second registered position,
   means for applying adhesive to said first individual sheets in said second registered position, and
   means for combining said first individual sheets from said second registered position with said second individual sheets in aligned relationship to each other.

2. Apparatus as in claim 1 wherein said means for controlling includes a rotating closed-track cam and means interconnecting said cam and said means for reciprocating.

3. Apparatus as in claim 2 wherein said means for reciprocating includes a number of means for gripping said individual sheets, each of said gripping means including a finger member for gripping said individual sheets and means for controlling said finger member to grip said individual sheets at said first means and to release said sheets at said second registered position.

4. Apparatus as in claim 3 wherein said means for reciprocating includes a fixed shaft and a shaft concentrically mounted thereon to rotate with respect to said fixed shaft, said rotating shaft including a cam member, and said means for gripping each further includes a cam follower engaging said cam and connected to said finger member to open and close said finger member in timed relation to said rotating closed-track cam.

5. Apparatus as in claim 4 wherein said means for gripping further includes a master finger member for adjusting the gripping of each finger member.

6. Apparatus as in claim 1 wherein said rotating means includes a rotatable drum having a perforated surface, means for creating a vacuum within said drum, a perforated blanket mounted to said surface in a registered position thereon to provide said second registered position, and means for cyclically varying the pressure within said drum from a vacuum for retaining said individual sheets on said blanket to essentially atmospheric pressure and a positive pressure greater than atmospheric pressure whereby said individual sheets are positively released from said blanket at said means for combining.

7. Apparatus as in claim 6 wherein said means for cyclically varying the pressure is a stationary end plate mounted to cover one end of said drum and including an elongated arcuate slot connected to said means for creating a vacuum, an aperture connected to the atmosphere and an additional aperture connected to a means for generating a positive pressure.

8. Apparatus as in claim 6 wherein said rotatable drum includes means for registering said perforated blanket thereon and said perforated blanket is removable so that different sized blanket may be mounted on said drum thereby enabling different sized first sheet material to be registered on said drum.

9. Apparatus as in claim 1 wherein said second means includes means for receiving and storing said second sheet material in vertically stacked relationship from a supply conveyor and means for sensing the height of said stacked sheet material to control the delivery of sheet material into said means for receiving.

10. Apparatus as in claim 9 wherein said means for sensing includes a rotatable cam member, a cam follower engaging said cam member, a reciprocating lever mounted in vertical relation to said stacked sheet material, means responsive to said lever to provide control signals indicative of the height of said stacked sheet material, and means for controlling said second means to deliver said second sheet material in accordance with said control signals.

11. Apparatus as in claim 9 wherein said second means and said means for receiving and storing are mounted on movable rails and said second means further includes means for moving the sheet material along said movable rails and means for sensing the presence of an individual sheet of said second sheet material to generate a signal for elevating said second means and said means for receiving and storing in the absence of an individual sheet.

12. Apparatus as in claim 11 wherein said second means for feeding further includes means for varying the speed of said means for driving so that said means for driving is de-accelerated prior to engaging an individual sheet at said means for receiving and storing and at said means for combining.

13. Apparatus as in claim 12 wherein said means for varying the speed includes a cam member mounted to rotate with said means for rotating about a fixed axis, cam follower means engaging said cam member, a rotatable housing attached to said cam follower, a rotatable shaft having a drive gear engaging said means for driving, and an additional gear engaging said gear whereby rotation of said housing about said shaft in accordance with the movement of said cam follower causes said drive gear to increase or decrease its speed of rotation.

References Cited

UNITED STATES PATENTS

| | | | |
|---|---|---|---|
| 2,715,975 | 8/1955 | Doane et al. | 156—521 |
| 2,744,562 | 5/1956 | La Rocca et al. | 156—556X |
| 2,830,724 | 4/1958 | Manas | 156—568X |
| 2,850,195 | 9/1958 | Van Dam | 156—364 |
| 3,341,390 | 9/1967 | Kirk | 156—521X |

BENJAMIN A. BORCHELT, Primary Examiner

J. M. HANLEY, Assistant Examiner

U.S. Cl. X.R.

271—37; 156—568